United States Patent
Keiser

(10) Patent No.: US 10,364,126 B2
(45) Date of Patent: Jul. 30, 2019

(54) SERVICING SYSTEM FOR AN ELEVATOR INSTALLATION

(71) Applicant: Inventio AG, Hergiswil (CH)

(72) Inventor: Hugo Keiser, Horw (CH)

(73) Assignee: INVENTIO AG, Hergiswil (CH)

( * ) Notice: Subject to any disclaimer, the term of this patent is extended or adjusted under 35 U.S.C. 154(b) by 41 days.

(21) Appl. No.: 15/324,739

(22) PCT Filed: Jun. 17, 2015

(86) PCT No.: PCT/EP2015/063650
§ 371 (c)(1),
(2) Date: Jan. 9, 2017

(87) PCT Pub. No.: WO2016/005161
PCT Pub. Date: Jan. 14, 2016

(65) Prior Publication Data
US 2017/0197805 A1    Jul. 13, 2017

(30) Foreign Application Priority Data
Jul. 8, 2014    (EP) .................................... 14176152

(51) Int. Cl.
*B66B 5/00*    (2006.01)
*G06K 7/10*    (2006.01)
(Continued)

(52) U.S. Cl.
CPC .......... *B66B 5/0087* (2013.01); *B66B 5/0025* (2013.01); *G06K 7/10297* (2013.01);
(Continued)

(58) Field of Classification Search
CPC ........ G08B 13/19613; G08B 13/19615; G08B 13/19608; G08B 13/1961; G08B 21/0476;
(Continued)

(56) References Cited

U.S. PATENT DOCUMENTS 7,319,967 B2 *   1/2008   Meyer ..................... B66B 3/00
                                                     187/388
2004/0094366 A1 *  5/2004  Weinberger ........... B66B 5/0025
                                                     187/247
(Continued)

FOREIGN PATENT DOCUMENTS

CN    101291865 A    10/2008
CN    102442596 A    5/2012
(Continued)

*Primary Examiner* — Marlon T Fletcher
(74) *Attorney, Agent, or Firm* — William J. Clemens; Shumaker, Loop & Kendrick, LLP

(57) ABSTRACT

A method for servicing at least one component of an elevator installation, wherein the component is provided with a mark, and the mark permits identification of this component, includes the steps of: reading in the mark by a reading device; listing, by the reading device at least one working step necessary for servicing the component, wherein the working step which is to be listed is determined on the basis of data which can be obtained from the mark; executing the servicing of the component; and inputting a confirmation into the reading device, by which confirmation the servicing which has been carried out on the component is confirmed. The method is performed by a servicing system for the elevator installation.

16 Claims, 2 Drawing Sheets

(51) Int. Cl.
*G06K 7/14* (2006.01)
*G06Q 10/00* (2012.01)
*G06Q 30/06* (2012.01)

(52) U.S. Cl.
CPC ......... *G06K 7/1413* (2013.01); *G06K 7/1417* (2013.01); *G06Q 10/20* (2013.01); *G06Q 30/0633* (2013.01)

(58) Field of Classification Search
CPC ......... Y02D 10/153; G02B 2027/0187; G01K 1/022; B66B 1/3492; B66B 1/46; B66B 2201/232; B66B 2201/4653; B66B 3/00; B66B 3/006; B66B 13/26; B66B 19/007; B66B 25/006; B66B 29/005; B66B 3/02; B66B 5/0025; B66B 5/0087
See application file for complete search history.

(56) References Cited

U.S. PATENT DOCUMENTS

| | | | |
|---|---|---|---|
| 2006/0144646 A1* | 7/2006 | Engel | B66B 5/0087 187/391 |
| 2008/0283342 A1* | 11/2008 | Deplazes | B66B 5/0025 187/391 |
| 2009/0255762 A1* | 10/2009 | Ketonen | B66B 13/22 187/247 |
| 2009/0321192 A1* | 12/2009 | Kattainen | B66B 5/0056 187/279 |
| 2011/0067958 A1* | 3/2011 | Schuster | B66B 1/34 187/393 |
| 2014/0299422 A1* | 10/2014 | Kangas | B66B 5/0018 187/394 |
| 2014/0339024 A1* | 11/2014 | Tyni | B66B 5/0006 187/393 |
| 2016/0311649 A1* | 10/2016 | Puranen | B66B 5/0018 |
| 2017/0197805 A1* | 7/2017 | Keiser | B66B 5/0087 |

FOREIGN PATENT DOCUMENTS

| | | |
|---|---|---|
| CN | 103116770 A | 5/2013 |
| CN | 203283978 U | 11/2013 |
| CN | 103832904 A | 6/2014 |
| EP | 1464605 A1 | 10/2004 |
| JP | 2006-264889 A | 10/2006 |
| JP | 2007112540 A | 5/2007 |
| WO | 2007046385 A1 | 4/2007 |

* cited by examiner

SERVICING SYSTEM FOR AN ELEVATOR INSTALLATION

FIELD

The invention pertains to a servicing system for an elevator installation, a method for servicing a component of the elevator installation, as well as such an elevator installation.

BACKGROUND

Elevator installations comprise several components that wear out over the course of time. In order to maintain the elevator installation fully functional over a long period, these components must be respectively serviced and maintained by a service technician. In many instances, the service technician can already determine whether or not the component may require servicing by visually inspecting the component.

Each individual elevator installation is serviced by a service technician within regular intervals. Such a service comprises at least one working step be carried out on the component of the elevator installation such as, for example, a condition check, function check, lubricating step or cleaning step or a repair and/or replacement of this component. The working step to be carried out at an applicable time depends, among other things, on whether a labor-intensive service or a less labor-intensive service is scheduled. In addition, a recent error message of the elevator installation may also lead to different servicing of the component.

Accordingly, the components of the elevator installation to be serviced and the activities to be carried out on the individual component itself are already specified prior to a scheduled service in a service list assigned to the elevator installation. This service list is processed sequentially during the service being carried out. The service technician subsequently confirms that the service has been carried out, wherein this confirmation is typically sent to a service center.

In such a method, however, it is problematic that the service technician can confirm to have carried out the service without actually having visually inspected the at least one component of the elevator installation to be serviced. Consequently, this service technician may under certain circumstances not realize that it is actually necessary to carry out the aforementioned working step.

SUMMARY

The invention is therefore based on the objective of improving the quality of servicing an elevator installation.

This objective is attained by means of a method for servicing at least one component of an elevator installation, wherein the component is provided with a mark and the mark allows an identification of this component, with said method comprising the following steps:
  reading in the mark by means of a reading device,
  listing at least one working step required for servicing the component by means of the reading device, wherein the working step to be listed is determined based on data obtainable from the mark,
  servicing the component, and
  inputting a confirmation into the reading device in order to thereby confirm that the component has been serviced.

The above-defined objective is also attained by means of a servicing system for an elevator installation comprising a component for the elevator installation, a mark that is arranged on the component and allows an identification of the component, and a reading device for reading in the mark, wherein said reading device is designed in such a way that at least one working step required for servicing the component can be listed by means of the reading device based on data obtainable from the mark and that a confirmation can be input into the reading device in order to thereby confirm that the service has been carried out.

The above-defined objective is likewise attained by means of an elevator installation with a component and a mark that is arranged on the component and allows an identification of this component, wherein said mark can be read in by means of a reading device and is designed such that at least one working step required for servicing the component can be listed by means of the reading device based on data obtainable from the mark.

During the service of an elevator installation, at least one component of this elevator installation may have to be serviced such that servicing several components of the elevator installation may be synonymous with servicing the elevator installation.

The invention is based on the realization that only one step of the entire servicing process other than the at least one working step for servicing the component itself has to take place in the immediate vicinity of the component to be serviced or being serviced in order to draw the attention of the service technician to the required working steps. It was therefore attempted to realize the servicing process in such a way that the service technician has to be present in the immediate vicinity of the component in order to actually confirm that the service has been carried out.

This is achieved in that the component is provided with a mark. The mark may be arranged or fastened directly on the component or in the preferably immediate vicinity of the component. When this mark is read in by means of the reading device, the at least one working step is listed and it actually becomes possible to confirm the service itself on the reading device. In other words, the service of the component cannot be considered as having been carried out without previously reading in the mark because it is otherwise impossible to actually confirm that the service has been carried out. This makes it possible, if applicable, to determine the time period required by the service technician for servicing the component. Such a time period is determined by evaluating an assumed starting time of the service on the one hand and an assumed completion time of the service on the other hand. Such a starting time may be set when the mark is read in by means of the reading device. Such a completion time may be set when the confirmation is input into the reading device in order to confirm that the service of the component has been carried out.

According to an enhancement of the method, the mark is replaced with a secondary mark when the component is serviced. After the method has been carried out, this secondary mark makes it possible to directly determine when this component was serviced or, if applicable, replaced. Such a replacement of the mark may likewise be carried out each time the component is serviced, for example, in order to encode information on the respective last service within the mark.

According to an enhancement of the method, the input of the confirmation into the reading device respectively comprises reading in the mark or the secondary mark. This means that the service technician reads in the mark prior to servicing the component, as well as after servicing of the component has been completed. If the mark was replaced with a secondary mark, the secondary mark may be read in instead of the mark after the component has been serviced. This ensures that the service technician is also present at the respective component after servicing of this component has been completed.

According to an enhancement of the method, the confirmation is sent to a central office for managing service data of the elevator installation. Such a central management of the service data makes it possible to retrace the condition of the elevator installation at any given time.

The mark or the secondary mark may not only allow the identification of the component, but also the identification of the elevator installation. In this way, the mark may furthermore contain data, for example, on the installation date of the elevator installation. It can therefore be ensured that the confirmation of the completed service can be biuniquely allocated to a certain elevator installation. With respect to the confirmation of the completed service, mix-ups, e.g., with elevator installations of the same design are therefore precluded. A thusly allocatable mark likewise makes it possible to determine which elevator installation is serviced at a given time. This can be realized, for example, by sending information on the beginning of the service to a/the central office for managing the service data when the mark is read in by means of the reading device.

The working steps required for servicing the components may be stored in the reading device. Alternatively, the required working steps for the service may be transmitted to the reading device from a central office based on the identification of the component by means of the reading device. This means that the transmission of the required working step to the reading device is initiated by reading in the mark.

Before the mark is read in by means of the reading device, the required working steps for servicing the component may be respectively stored within the reading device or the central office. If the service data is stored beforehand within the central office, any service technician can service the elevator installation to be serviced because the service technician can retrieve the corresponding service data at any time by means of the available reading device. It is accordingly furthermore possible to retrace the beginning of the service of the component in the central office. For example, faults reports received prior to the service can affect the required servicing process.

According to an enhancement of the method, a storage of ambient conditions of the component to be serviced, i.e. a storage of ambient conditions of this component prior to its servicing, is initiated by reading in the mark. In this way, detectable characteristics of the component can be recorded, i.e. stored. If applicable, malfunctions of this component prior to its subsequent servicing and/or after its servicing can be retraced based on this stored information. Consequently, such stored information makes it possible to retroactively determine that a repair/replacement of this component was necessary.

According to an enhancement of the method, a storage of ambient conditions of the serviced component, i.e. a storage of ambient conditions of this component after its servicing, is initiated by respectively reading in the mark or the secondary mark. In this way, detectable characteristics of the component can be recorded, i.e. stored. Due to the fact that a test, which is usually carried out when the component is serviced and declared as a separate working step, may potentially include a restoration of the full functionality of the component, it can be retroactively retraced if the test was dutifully carried out.

If such a storage was initiated, i.e. carried out, prior to the scheduled service, as well as after the completed service, it can be determined which of the working steps that form the servicing process were actually carried out by the service technician with respect to potentially existing malfunctions prior to the scheduled service.

The storage of ambient conditions may be realized, for example, in the form of a photograph, in the form of a vibration measurement to be carried out a few seconds after reading in the mark/secondary mark by placing the reading device on the component or in the form of a noise recording. Such a storage of ambient conditions may be carried out, for example, while the component operates in a service mode. For this purpose, it may be necessary to hold the reading device on the component for a few seconds after reading in the mark/secondary mark. It may additionally or alternatively be necessary, for example, to place the reading device on the component for a few seconds after reading in the mark/secondary mark in order to measure the aforementioned vibrations.

According to an enhancement of the method, the ability to trigger an ordering process for the replacement of a part of the component to be serviced with a separate input into the reading device is initiated by reading in the mark by means of the reading device. Consequently, a part of the component, which is considered to be defective, can be ordered during the service.

According to an enhancement of the method, the elevator installation features a first and a second component to be serviced and the input of the confirmation of a completed service of the first component into the reading device dictates that the second component needs to be serviced after this completed service of the first component. After an interruption in the service of the elevator installation, a registration of the last component of this elevator installation serviced makes it possible to inform the service technician which component of the elevator installation needs to be serviced next in accordance with a predefined sequence. Time savings can thereby be achieved.

According to an enhancement of the method, parameters of the component acquired during its servicing are stored in the reading device. These parameters can be stored and accordingly retrieved during future servicing of the component such that this stored parameter can during the future servicing be compared with current parameters acquired during the future servicing. This makes it possible to draw conclusions on the wear of the component.

The mark may be realized, for example, in the form of a dot or QR (Quick Response) code or bar code or in the form of an AFID transponder or color pattern. Depending on the component to be serviced, the mark therefore can be chosen in such a way that ambient conditions, e.g. an increased risk of dirt accumulation in the surroundings of the mark, have no appreciable effect.

DESCRIPTION OF THE DRAWINGS

The invention is described in greater detail below with reference to the figures. In these figures.

DETAILED DESCRIPTION

Figure 1:
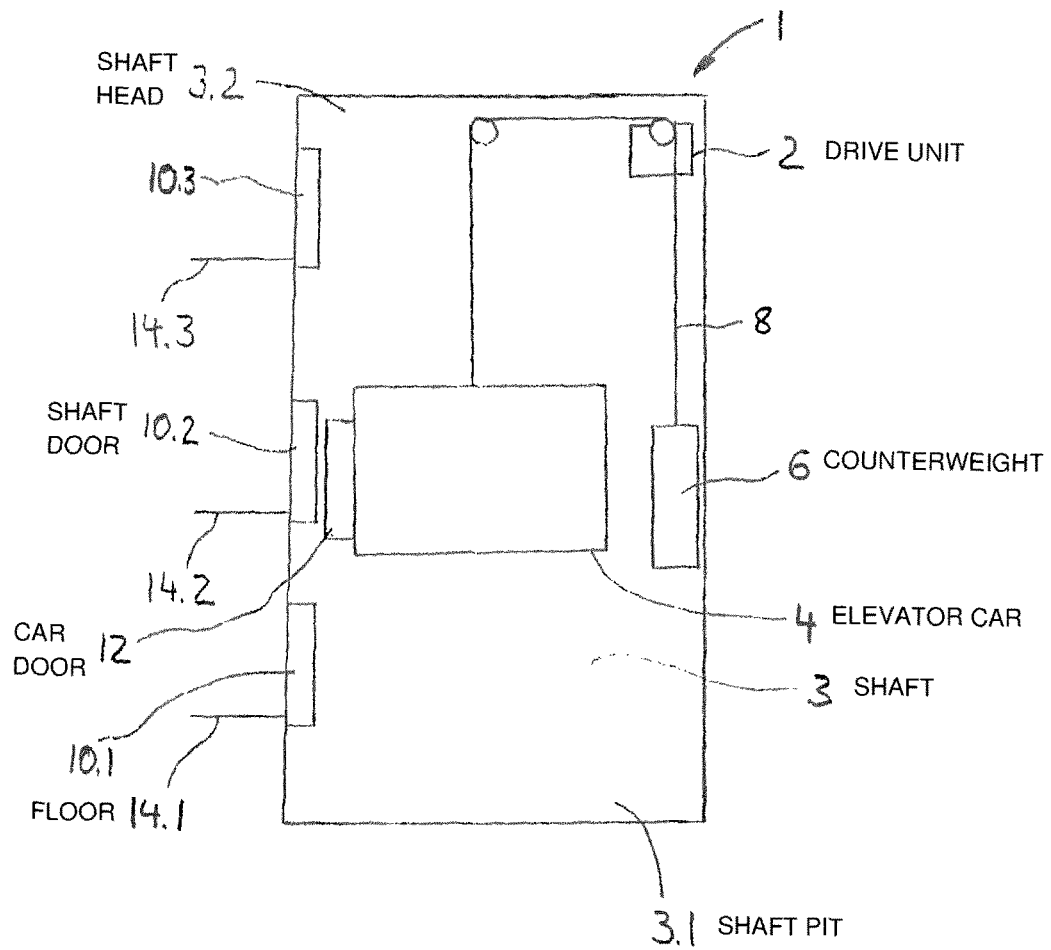
FIG. 1 shows an elevator installation with a plurality of components.

FIG. 1 shows an elevator installation 1, wherein said elevator installation 1 is essentially arranged in an elevator shaft 3. The elevator installation 1 comprises several exemplary components 2, 4, 6, 8, 10.1, 10.2, 10.3, 12. These components of the elevator installation 1 consists of a drive unit 2, an elevator car 4 that can be displaced in the elevator shaft 3 and several shaft doors 10.1, 10.2, 10.3 arranged on floors 14.1, 14.2, 14.3. The elevator car 4 comprises at least one car door 12. The elevator shaft 3 features a shaft pit 3.1 underneath the lowermost of the shaft doors 10.1, 10.2, 10.3. The elevator shaft 3 furthermore features a shaft head 3.2 above the uppermost of the shaft doors 10.1, 10.2, 10.3.

Suspension means 8 and a counterweight 6 may form other components of the elevator installation 1. The suspension means 8 may be guided in the head of the elevator shaft 3 by means of the drive unit 2, wherein a first end of the suspension means 8 is coupled to the elevator car 4 and a second end of the suspension means 8 is coupled to the counterweight such that the counterweight 6 and the elevator car 4 can be displaced in opposite directions in the elevator shaft 3.

Figure 2:
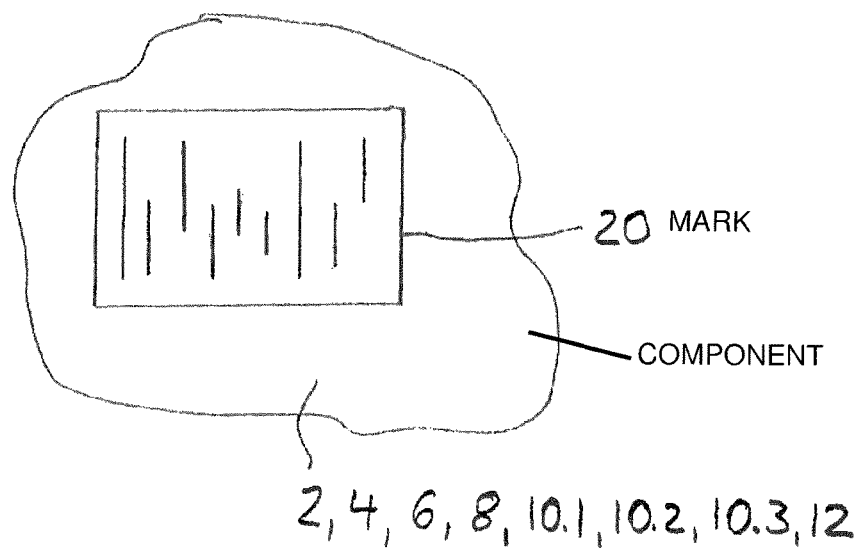
FIG. 2 shows a mark arranged on a component.

FIG. 2 shows a mark 20 that is arranged on an exemplary component 2, 4, 6, 8, 10.1, 10.2, 10.3, 12 illustrated in FIG. 1. For example, the mark 20 is bonded to this component or otherwise fixed thereon. The mark 20 may be realized in the form of a source code, color code, AFID transponder or alphanumeric characters or in the form of a bar or dot code. The mark 20 represents an information storage. Consequently, the mark 20 may contain encoded data concerning, for example, the installation site of the elevator installation 1, an elevator number identifying the elevator installation 1 and/or the installation date of the elevator installation 1. Data concerning peculiarities of the component to be serviced may likewise be stored. The mark 20 may furthermore contain information that characterizes the installation date of the component 2, 4, 6, 8, 10.1, 10.2, 10.3, 12, wherein said component 2, 4, 6, 8, 10.1, 10.2, 10.3, 12 may, if applicable, have been replaced with an identically constructed component 2, 4, 6, 8, 10.1, 10.2, 10.3, 12 during a previous service. Such a new component 2, 4, 6, 8, 10.1, 10.2, 10.3, 12 may be provided with a secondary mark that replaces the original mark 20. Each mark 20 illustrated in FIG. 2 may likewise be replaced with a secondary mark when the component 2, 4, 6, 8, 10.1, 10.2, 10.3, 12 is serviced. Such secondary marks have the same properties as the original mark 20, wherein individual data of the secondary mark may be updated.

A component 2, 4, 6, 8, 10.1, 10.2, 10.3, 12 is likewise considered as being provided with a mark 20 if the mark 20 is arranged in the immediate vicinity of the component 2, 4, 6, 8, 10.1, 10.2, 10.3, 12 or in the immediate vicinity of a predefined position of this component 2, 4, 6, 8, 10.1, 10.2, 10.3, 12. For example, the counterweight 6 assumes such a predefined position when the counterweight 6 is arranged in the shaft pit and the elevator car 4 is arranged in the shaft head. Consequently, the mark 20 assigned to the counterweight 6 is arranged, for example, in the immediate vicinity of such a predefined position if this mark 20 is arranged in the shaft pit. The mark 20 is preferably arranged in such a way that the service technician has to move into a position within the elevator installation, from which the majority of the working steps for servicing the component 2, 4, 6, 8, 10.1, 10.2, 10.3, 12 can be carried out, in order to read in the mark 20 by means of a reading device.

Figure 3:
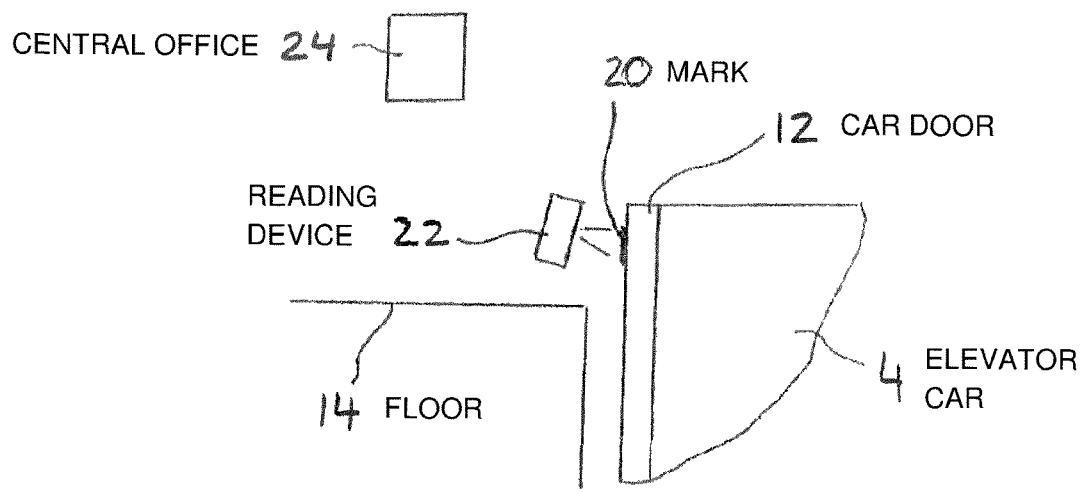
FIG. 3 shows a reading device arranged on a component while it is serviced.

FIG. 3 shows a reading device 22 that is arranged at the car door 12 in order to read in a mark 20 assigned to the car door 12 of the elevator car 4. Such a mark 20 assigned to the car door 12 is preferably arranged on a door leaf or a transom of the car door 12. Consequently, a service technician can read in the mark 20 with the aid of the reading device 22 from a floor 14 if the elevator car 4 is arranged in a corresponding position in the elevator shaft for servicing the car door 12. The service of the car door 12 may include replacing, testing or repairing different components of the car door 12 such as, for example, the door lock, the door drive, the door guide, guide shoes for guiding the door leaves of the car door in the car door sill and/or door contacts.

The reading device 22 is connected or can be connected to a central office 24 for respectively managing service data of the elevator installation and service data of the exemplary component in the form of the car door 12 by means of a wireless communication network. The mark 20 is read in by means of the reading device 22 when the component 12 is serviced. In this way, a storage of ambient conditions of the car door 12 can be initiated by reading in the mark by means of the reading device 22. The ambient conditions may be stored in the form of a photograph that, if applicable, shows operational damages of the car door 12 such as, for example, door leaves deformed by elevator passengers or cables of a car door control that are singed due to short circuits. Once the reading device 22 is connected to the central office 24, the at least one working step required for servicing the component 12 is selected based on the data contained in the mark 20 and transmitted from the central office 24 to the reading device 22. Data encoded in the mark 20 therefore causes at least one working step to be selected from a plurality of potential working steps for servicing this component 12. In this context, the expression based on data contained in the mark 20 refers, for example, to accessing data that is assigned to this component 12 and stored in a database. Such a database may be stored in the central office 24 or in the reading device 22 itself.

This working step is displayed on the reading device 22 in order to provide the service technician with the required service information. For example, the data concerning the installation date of the elevator installation comprising the component 12 to be serviced, which is encoded in the mark 20, may result in a listing of the working steps to be carried out during the service in dependence on this date.

Subsequently, the listed working steps for servicing the component 12 are carried out. After the service of the component 12 is completed, it is confirmed that these working steps have been carried out by means of a corresponding input into the reading device 22. This confirmation may initiate a storage of ambient conditions similar to the optional storage of ambient conditions prior to the service of the component 12.

Depending on its functional requirements, the reading device 22 may consist of a mobile telephone, a handheld device or a preferably portable computer. The exemplary service of the car door 12 described with reference to FIG. 3 can likewise be applied to other components of the elevator installation.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for servicing at least one component of an elevator installation comprising the steps of:
providing the at least one component with a mark, the mark containing data including identification information of the at least one component;
reading the mark with a reading device to obtain the data contained in the mark, wherein the reading device is separate from the at least one component, and wherein a storage of ambient conditions of the at least one component to be serviced is initiated by reading in the mark or a secondary mark;
listing by the reading device at least one working step required for servicing the at least one component, wherein the at least one working step is determined based on the data obtained from the mark;
servicing the at least one component by performing the at least one working step; and
inputting a confirmation into the reading device to confirm that the at least one component has been serviced.

2. The method according to claim 1 wherein the input of the confirmation into the reading device includes reading in the mark.

3. The method according to claim 1 including replacing the mark with the secondary mark when the at least one component is serviced.

4. The method according to claim 3 wherein the input of the confirmation into the reading device includes reading in the secondary mark.

5. The method according to claim 1 including sending the confirmation to a central office for managing service data of the elevator installation.

6. The method according to claim 1 wherein the mark, or the secondary mark replacing the mark when the at least one component is serviced, includes an identification of the elevator installation.

7. The method according to claim 1 including storing the at least one working step required for servicing the at least one component in the reading device.

8. The method according to claim 1 including transmitting the at least one working step required for servicing the at least one component from a central office to the reading device based on the identification of the at least one component by the reading device.

9. The method according to claim 1 including storing the at least one working step required for servicing the at least one component within the reading device or in a central office before the mark is read by the reading device.

10. The method according to claim 1 including storing a time of reading in the mark or the secondary mark.

11. The method according to claim 1 including triggering an ordering process for replacement of a part of the at least one component with a separate input into the reading device initiated by the reading of the mark by the reading device.

12. The method according to claim 1 wherein the at least one component is a first component, the elevator installation includes a second component to be serviced, and the inputting of the confirmation of a completed service of the first component into the reading device dictates that the second component needs to be serviced after the completed service of the first component.

13. The method according to claim 1 wherein parameters of the at least one component are acquired during the servicing and are stored in the reading device.

14. A servicing system for an elevator installation, the elevator system having at least one component to be serviced, comprising:
a mark arranged on or in an immediate vicinity of the at least one component, wherein the mark includes identification information of the at least one component; and
a reading device for reading in the mark, wherein the reading device is configured to initiate a storage of ambient conditions of the at least one component to be serviced when reading in the mark, and wherein the reading device is separate from the at least one component, and wherein the reading device lists at least one working step for servicing the component based on data obtained from the mark and the reading device accepts a confirmation input to thereby confirm that the servicing has been carried out.

15. The servicing system according to claim 14 wherein the mark is formed as one or more of a dot, a QR code, a bar code, an RFID transponder and a color pattern.

16. An elevator installation comprising:
at least one component to be serviced;
a mark arranged on or in an immediate vicinity of the at least one component, the mark including identification information of the at least one component; and
a reading device for reading the mark and listing at least one working step required for servicing the at least one component based on data obtained from the mark by the reading device, wherein the reading device is configured to initiate a storage of ambient conditions of the at least one component to be serviced when reading in the mark, and wherein the reading device is separate from the at least one component, and the reading device accepts a confirmation input to thereby confirm that the servicing has been carried out.

* * * * *